United States Patent [19]

Bolduc et al.

[11] Patent Number: 4,795,535
[45] Date of Patent: Jan. 3, 1989

[54] PROCESS FOR THE PRODUCTION OF ALKALI METAL CHLORATE

[75] Inventors: Ghislain Bolduc, Magog, Canada; Karl J. F. Wanngard, Sundsvall, Sweden

[73] Assignee: Eka Nobel AB, Surte, Sweden

[21] Appl. No.: 127,480

[22] Filed: Dec. 2, 1987

[30] Foreign Application Priority Data

Dec. 4, 1986 [SE] Sweden ............................ 8605222

[51] Int. Cl.$^4$ .............................................. C25B 1/24
[52] U.S. Cl. ........................................ 204/95; 204/129; 203/48; 423/475
[58] Field of Search .................... 204/95, 129; 203/48; 423/475

[56] References Cited

U.S. PATENT DOCUMENTS 4,510,026 4/1985 Spaziante ........................... 204/95

Primary Examiner—R. L. Andrews
Attorney, Agent, or Firm—Burns, Doane, Swecker & Mathis

[57] ABSTRACT

At the production of alkali metal chlorate by electrolysis of alkali metal chloride in an electrolyser a part of the liquid phase from the electrolyser is brought to a crystallizer for precipitation of alkali metal chlorate crystals. The hydrogen gas formed in the electrolyser is purified from contamination of chlorine gas by contacting it with the outgoing mother liquor from the crystallizer, which has a pH in the interval 7.5 to 14. The mother liquor is then brought back to the electrolysis system.

9 Claims, 1 Drawing Sheet

PROCESS FOR THE PRODUCTION OF ALKALI METAL CHLORATE

The present invention relates to a process for the production of alkali metal chlorate by electrolysis of an electrolyte containing alkali metal chloride. More specifically the invention relates to a process for purifying the hydrogen gas, formed at the electrolytic process, from chlorine gas contamination.

Alkali metal chlorate, and particularly sodium chlorate, is an important chemical in the cellulose industry, where it is used as a raw material for the production of chlorine dioxide, which is an important bleaching chemical for cellulose fibres.

Alkali metal chlorate is produced by electrolysis of alkali metal chloride, whereby alkali metal chlorate and hydrogen gas are formed according to the net formula

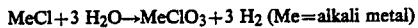
$$MeCl + 3 H_2O \rightarrow MeClO_3 + 3 H_2 \quad (Me = \text{alkali metal})$$

The process is run in a cycle where in a first step a brine is brought to an electrolyser for reaction at the electrodes. The solution is then brought to reactor vessels for further reaction. A smaller part of the flow from the reactor tanks is brought to a crystallizer for precipitation of chlorate crystals. The main part of the flow is brought back to the electrolyser for renewed reaction. The mother liquor leaving the crystallizer is also recycled for electrolysis. To compensate for consumed alkali metal chloride a brine is added to the flow entering the electrolyser. The flows in the process are very large. This is necessary because large amounts of heat are evolved at the electrolysis reaction. Large flows of liquid are required to take care of these large amounts of heat. At the passage through the electrolyser only a few per cent of the alkali metal chloride are converted.

At the electrolysis hydrogen gas is evolved at the cathode. The hydrogen gas is contaminated by a small amount of chlorine gas, also formed at the electrolysis. It is necessary to purify the hydrogen gas from the chlorine gas, which otherwise can cause problems with corrosion, health, odour and environment. The subsequent use of the hydrogen gas for chemical reactions or for combustion is also made more difficult. The purification is carried out by making the hydrogen gas meet a stream of alkali metal hydroxide MeOH in a scrubber tower, whereby the following reaction takes place:

$$2 MeOH + Cl_2 \rightarrow MeClO + MeCl + H_2O$$

The resulting solution can suitably be brought to the electrolytic system.

Alkali chlorate production is made in different steps within a pH interval from 5.5 to 12. The pH must be carefully regulated so that every reaction will take place at its optimum. The process is therefor consuming alkali hydroxide and acid. The flows through the electrolysers are large in order to control the temperature at the chlorate electrolysis at an optimal level, about 50°–100° C., and to guarantee a good supply of reactants to the surfaces of the electrodes at the same time. The main part of the flow is recirculated to the electrolysers through heat exchangers, while a part is brought to reactor vessels for completion of the convertion to chlorate. A smaller part of the flow is withdrawn from the reaction vessel to the crystallizer.

Additions of alkali and acid is required to keep the pH at an optimal level in each step of the process. The costs for these chemicals are considerable, as a result of the size of the flows, and it is therefor of great importance to keep the consumption at a low level by optimal utilization of available alkali.

In the crystallizer water is evaporated under vacuum and thus the temperature and the solubility is reduced, whereby the chlorate crystals are precipitated. At the crystallization a high pH is required, otherwise the formed hypochlorite is converted to chlorine. Such a convertion causes odour in the factory and a loss in the chlorate yield. Furthermore, the chlorine gas has negative effects on the environment and causes corrosion. It is therefor desirable to run the crystallizer with a large excess of hydroxide, to suppress the formation of chlorine gas and to obtain as good a yield as possible. However, from an economical point of view it has not been possible to run the crystallizer with too large excess of hydroxide at these large flows in question. When the mother liquor is brought back to the system it is necessary to reduce the pH by supplying acid because the optimal pH value in the electrolyser is in the interval of 5.5–7.5. If the mother liquor has a considerable excess of hydroxide, large amounts of acid are needed for the pH reduction, and this considerably influences the production costs.

The present invention now offers a way of making use of the excess of alkali hydroxide from the crystallizer by using the outgoing flows as washing liquor in the hydrogen gas scrubber tower for purification of the hydrogen gas flow from the electrolyser in the manner stated in the claims.

By bringing the electrolyte flow from the crystallizer to the hydrogen gas scrubber tower the excess of hydroxide is utilized for chlorine gas absorption. In this case the mother liquor can have a large excess of hydroxide which is utilized in the scrubber tower to which fresh alkali hydroxide usually is brought. This results in a reduced consumption of hydroxide in the scrubber tower and a reduced acid consumption in the electrolytic system for adjustment of the too high pH value in the mother liquor returning from the crystallizer. Besides, there is also the advantage of being able to run the crystallizer at the pH value which gives the best effect, without having to consider if the mother liquor gets a too large content of hydroxide.

When carrying out the process according to the present invention a purified alkali metal chloride solution is brought to an electrolyser. This can be equipped with a metal anode including a titanium substrate and a coating of at least one of the metals in the platinum group, or an oxide thereof applied on the substrate. As cathode can be used an electrode made of iron, carbon steel, stainless steel or titanium or comprising such a metal and a metal of the platinum group. The type of electrolyser can be either a unipolar or a bipolar cell. For example, as a suitable electrolyser to be used according to the invention can be mentioned the device described in the U.S. Pat. No. 4,326,941. Sodium is preferred as alkali metal but potassium chloride can also be prepared according to the present process. The flow leaving the electrolyser is divided into two parts, of which one flow is brought to reactor tanks for further reaction to chlorate, while the other is brought back, via a cooler, to the electrolyser. The main part of the flow leaving the reactor tanks is brought back to the electrolyser. A smaller part, 5–25% is fed to the crystallizer for precipitation of chlorate. The pH in the electrolyser and in the reaction tanks is suitable kept within the interval from 5.5 to 7.5, preferably within the interval from 6.1 to 7.1. The flow leaving the crystallizer suitably has a pH in the range of 7.5 to 14, preferably within the interval 7.5 to 12 and especially preferred is the interval of from 8.5 to 11.5. There is a special demand for a high pH in the crystallizer if this is equipped with an indirect condenser, which will corrode in the presence of chlorine compounds. Of the flow leaving the crystallizer 30–100%, preferably 60–100% are brought to a hydrogen gas scrubber tower and the remaining flow, if any, is brought to the electrolyser. As a scrubber tower can e.g. be used a packed tower, a spray tower, a bubble cap or sieve-plate tower or any other sets of apparatus giving a large area of mass transfer. In the scrubber tower the excess of alkali is consumed by reaction with the chlorine gas contaminating the hydrogen. Further, the mother liquor will be heated thereby dissolving the remaining small crystal nuclei which would otherwise precipitate in the storage tanks. At the same time the purified hydrogen gas is cooled by the mother liquor, whereby water vapor is condensed and can be brought back to the process. This is an advantage as otherwise un increased addition of fresh water of high purity is demanded in the process which, as a whole, is water consuming according the formula:

$$NaCl + 3 H_2O \rightarrow NaClO_3 + 3 H_2$$

The flow from the scrubber tower, which flow should have a pH within the interval 7.0–8.0, is brought back to the electrolysis system, suitably to the reaction tanks.

To make it possible to wash away all the chlorine gas an excess of alkali is demanded. For reasons of safety two gas scrubber towers are used to make it possible for all chlorine to be removed and also for the purpose of not having a too large apparatus. Thus, if all hydroxide is to be used in the first scrubber tower, this must be made too large to be acceptable from a technical and economic point of view. In the first scrubber tower the hydrogen gas is contacted with the mother liquor, in the way described above, and, in the second, it is contacted with fresh alkali hydroxide. The alkali hydroxide is used in an excess of 5–200 g NaOH/l, preferably 20–100 g NaOH/l, to secure the final purification of the hydrogen gas. The washing solution leaving the second scrubber tower and containing unused hydroxide, can be used for alkalization of the flow of the crystallizer. This method is advantageous in that the total consumption of alkali in the process is reduced. In addition to the flow of mother liquor, other alkaline flows, such as filtrate from the purification of the chlorate electrolyte, can also be brought to the first scrubber tower. A part of the flow from the second scrubber tower can also be brought to the first tower. By bringing back the flows from the scrubber towers to the electrolytic circulation the washed away chlorine is also taken care of, and brought back to the total yield of the process.

The process is now described with reference to FIG. 1 showing a schematic plan of a plant for carrying out the process of the invention.

BRIEF DESCRIPTION OF THE DRAWING

In the FIG. (1) designates the manufacturing of brine and (2) a number of electrolysers, each comprising a bipolar electrode assembly, where the anode consists of a titanium core coated with oxides of the metals of the platinum group and the cathode consists of steal plates.

DETAILED DESCRIPTION OF THE DRAWING

Figure 1:
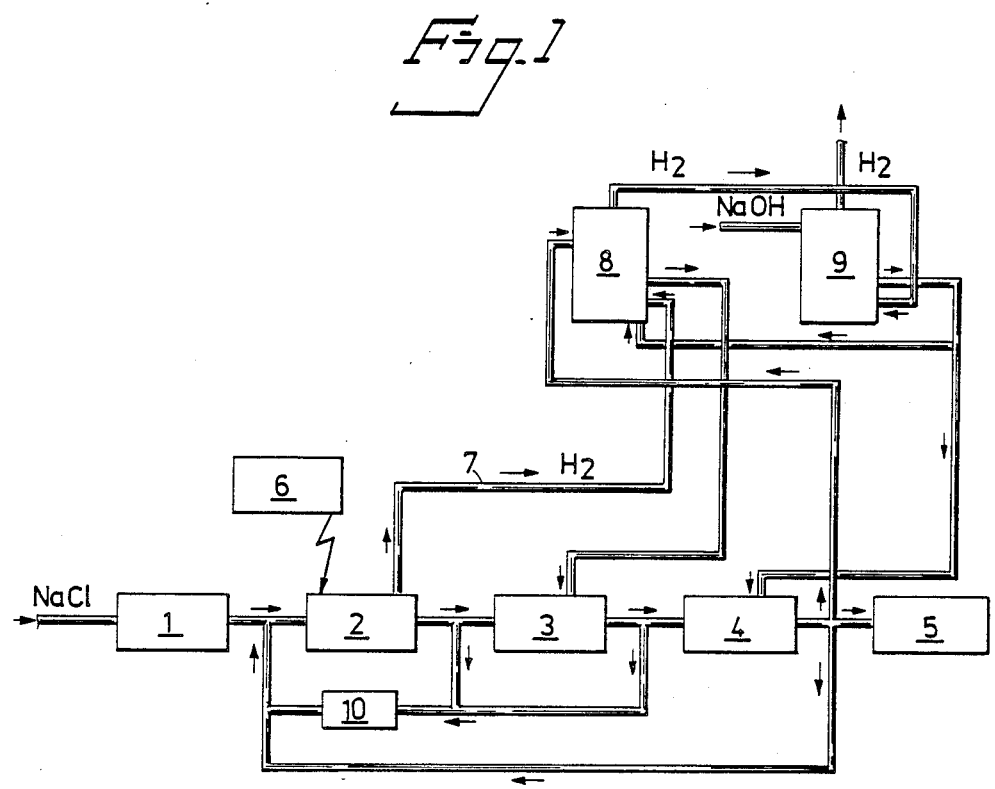

Each electrolytic cell works with a current density of 10–45 amperes, preferably 20–40 amperes, per litre circulating electrolyte and the electrolyte has a temperature of about 70° C. A part of the reaction solution is cooled at (10) and brought back to the electrolyser while the other part is brought to reaction tanks (3), where the chlorate forming reaction proceeds. A part of the flow leaving the reaction tanks is brought to the crystallizer (4). The incoming flow is made alkaline and the outgoing flow is brought to the hydrogen gas scrubber tower (8) in an amount of 30–100 per cent by weight, preferably 60–100 per cent by weight. The hydrogen gas (7) is brought to the scrubber tower (8) from the electrolysers (2). The hydrogen gas is brought on to a second scrubber tower (9). In FIG. 1 (6) indicates the power system and (5) the handling of chlorate crystals.

EXAMPLE

The flow of the crystallizer can e.g. comprise of about 10 m$^3$/ton produced sodium chlorate, containing among other things 2,5 g NaClO/l (Cl$_2$+HClO$^-$+HClO as NaClO), 4 g Na$_2$Cr$_2$O$_7$/l ( the dichromate is used to prevent the hypochlorite ions being reduced back to chloride at the cathode). Normally, alkalization to a pH of 10 is required, which will demand an addition of alkali in an amount of about 0.9 kg NaOH/m$^3$. Of this amount of alkali, about 0.6 kg/m$^3$ can be used for chlorine absorption in the hydrogen gas scrubber tower. To manage to trap all the chlorine in the hydrogen gas, about 10 kg NaOH/ton NaClO$_3$ is required, and thus 60% of the need can be provided for with the excess of alkali in the mother liquor from the crystallizer.

Case 1

In a chlorate factory according to the state of the art. All the chlorine gas is absorbed in pure NaOH-solution. Then the consumption of alkali will be:
In the scrubber tower: 10 kg/ton
In the crystallizer: 10×0.9 kg/ton
Totally 19 kg/ton

Case 2

After rebuilding according to the invention. First the chlorine gas is contacted with the mother liquor from the crystallizer and then with pure NaOH-solution in a secondary scrubber tower (9). Then the alkali consumption will be:
In the feed flow to the crystallizer: 10×0.9 kg/ton
In the secondary scrubber tower: 10−10×0.6 kg/ton
Total consumption: 13 kg/ton Thus there is a saving of 30% of the NaOH consumption which results in a correspondent equi molar saving of HCl of 30%, which it otherwise would have been necessary to add to lower the pH value in the mother liquor before it was recycled to the electrolyser.

Case 3

In another chlorate factory, for years, the consumption of alkali was 25 kg/ton and the consumption of hydrochloric acid 23 kg/ton. After rebuilding according to the invention the consumption was lowered to 18 respective 16 kg/ton, thus in both cases with about 30%.

The hydrogen gas (7) is brought from the first scrubber tower to the second. To absorb all the chlorine in the cell- gas the absorption system should be run with a excess of alkali of about 5 kg NaOH/ton $NaClO_3$. If the excess of alkali is used for alkalization of the inflow of the crystallizer, a further saving of 5 kg NaOH/ton and, stoichiometrically 4.6 kg of 100 per cent of HCl/ton, can be made, which HCl otherwise would have been needed to neutralize the flow leaving the absorption column, if that was to be added to the feed flow to the electrolyser or the reaction tanks.

We claim:

1. A process for the production of alkali metal chlorate by electrolysis of an electrolyte containing alkali metal chloride in an electrolyser, whereby a part of the liquid phase is brought from the electrolyser to a crystallizer for precipitation of crystals of alkali metal chlorate, characterized in that hydrogen gas formed in the electrolyser is purified from contamination of chlorine gas by contacting it with 30–100 per cent by weight of the mother liquor leaving the crystallizer, which mother liquor has a pH in the interval of from 7.5 to 14, whereafter the mother liquor is recycled to the electrolysis system.

2. A process according to claim 1, characterized in that the outgoing mother liquor has a pH in the interval from 7.5 to 12.

3. A process according to claim 2, characterized in that the outgoing mother liquor has a pH in the interval from 8.5 to 11.5.

4. A process according to claim 1, characterized in that the flow of hydrogen gas is contacted with 60–100 per cent by weight of the mother liquor.

5. A process according to claim 1, characterized in that the flow of hydrogen gas is contacted with pure alkali hydroxide in a second step.

6. A process according to claim 5, characterized in that the whole or a part of the alkali hydroxide leaving the second step is added to the flow to the crystallizer.

7. A process according to claim 6, characterized in that any remaining flow of the alkali hydroxide leaving the second step is brought to the first step of purification for purifying the hydrogen gas from the contamination of chlorine gas.

8. A process according to claim 1, characterized in that the flow of hydrogen gas is contacted with at least another alkaline flow.

9. A process according to claim 8, characterized in that said alkaline flow comprises the filtrate from the filters at the purification of the chlorate electrolyte.

* * * * *